Nov. 7, 1967 SEKI KONO 3,351,413
CINEMATOGRAPHIC CAMERA WITH MAGAZINE HAVING SENSITIVITY CONTROL
Filed March 30, 1965 2 Sheets-Sheet 1

INVENTOR
Seki Kono
BY Wenderoth, Lind + Ponack
ATTORNEYS

Nov. 7, 1967  SEKI KONO  3,351,413
CINEMATOGRAPHIC CAMERA WITH MAGAZINE HAVING SENSITIVITY CONTROL
Filed March 30, 1965  2 Sheets-Sheet 2

INVENTOR
Seki Kono
BY Wenderoth, Lind & Ponack
ATTORNEYS

United States Patent Office 3,351,413
Patented Nov. 7, 1967

3,351,413
CINEMATOGRAPHIC CAMERA WITH MAGAZINE HAVING SENSITIVITY CONTROL
Seki Kono, Nagoya, Japan, assignor to Elmo Company Limited, Nagoya, Japan
Filed Mar. 30, 1965, Ser. No. 443,953
Claims priority, application Japan, Apr. 10, 1964, 39/27,705
2 Claims. (Cl. 352—72)

This invention relates to a sensitivity controlled change-over device for use with a small-sized cinematographic camera including a main body and an interchangeable film magazine designed and constructed such that after a scene or scenes has or have been photographed on the entire half side of a cinefilm loaded in the magazine the latter is, upside down, secured to the main body for subsequent photographing on the remaining half side of the cinefilm.

In the conventional type of small-sized cinematographic camera including an interchangeable magazine in which a length of cinefilm is loaded and a stop device for automatically setting an exposure, means for manually controlling the exposure according to the sensitivity of the cinefilm involved have been disposed in the main body of the camera. If a plurality of magazines having loaded therein lengths of cinefilm having different sensitivities are desired to be selectively used with the main body of such a camera, an operator may forget setting of such control means to the sensitivity of the particular cinefilm involved with the result that the cinefilm is not subject to the proper exposure commensurate with the sensitivity.

Accordingly the primary object of the invention is to eliminate in the cinematographic camera of the type above described, the special operation of setting automatic exposure control to a sensitivity of the particular cinefilm involved upon interchanging one film magazine to another magazine whereby the cinefilm is always imparted the proper exposures.

Another object of the invention is to provide a new and improved device disposed on an interchangeable film magazine for use with a camera of the type above described, serving to manually set a stop for a photographic objective to a sensitivity of a cinefilm involved.

With the aforesaid objects in view, the invention resides in a sensitivity controlled changeover device for use with a small-sized cinematographic camera including a main body, a cinefilm chamber or magazine detachably secured to the main body, and an automatic exposure mechanism, characterized by a sensitivity set member on the magazine manually adjustable in accordance with a sensitivity of the particular cinefilm loaded in the magazine, said sensitivity set member being arranged such that when the magazine with the sensitivity set member adjusted to the sensitivity of the cinefilm loaded in the same is operatively coupled to the main body an electric circuit within the main body to control the automatic exposure mechanism is electrically connected to an electric circuit with the sensitivity set member to set the automatic exposure mechanism to the sensitivity of the cinefilm in the magazine.

The invention will become more readily apparent from the following detailed description taken in conjunction with the accompanying drawings in which:

FIG. 2b shows a schematic electric circuit for use with the automatic exposure device illustrated in FIG. 2a; and FIG. 3 shows an exploded perspective view of the camera including the automatic exposure device illustrated in FIG. 2a.

Figure 1:
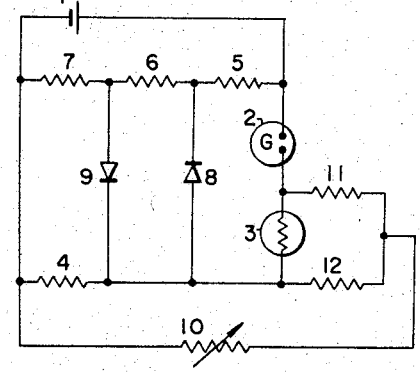
FIG. 1 shows a schematic electric circuit for use with a small-sized cinematographic camera including an interchangeable film magazine constructed in accordance with the teachings of the prior art.

Referring now to FIG. 1, there is illustrated a prior art type device in which a sensitivity controlled change-over device is disposed on the side of the main body of a small-sized cinematographic camera including an interchangeable magazine. An electric circuit illustrated comprises an electric source such as a mercury cell 1, a galvanometer 2, a photoconductive element 3 and a fixed resistor 4 connected in series circuit relationship in the named order. The purpose of the fixed resistor 4 is to convert a variation in the form of a geometrical progression in resistance of the photoconductive element 3 dependent upon an amount of light falling upon the element into a variation in the form of an arithmetical progression in current. The latter variation in current causes the galvanometer 2 to swing thereby to correspondingly drive blades or sectors of a diaphragm device (not shown) in any suitable manner whereby an automatic stop is set. A series arrangement of fixed resistors 5, 6 and 7 is connected across the mercury cell 1. A semiconductor diode 8 is connected between the junction of the resistors 5 and 6 and the junction of the photoconductive element 3 and the resistor 4 while another semiconductor diode 9 poled reversely from the diode 8 is connected between the junction of the resistors 6 and 7 and the junction of the element 3 and the resistor 4. The resistors 5, 6 and 7 and the diodes 8 and 9 cooperate together to correct for the nonlinear brightness-current characteristics over a wide range to render such characteristics substantially linear.

In order that a flow of current variable in accordance with a sensitivity of a cinefilm involved is caused to flow through the galvanometer 2 in additive relationship to a flow of current dependent upon the brightness of an object to be photographed flowing through the abovementioned electric circuit for controlling an automatic exposure mechanism, a variable resistor 10 is provided having one end connected to one terminal of the mercury cell 1 and the other end connected to a junction of two parallel connected fixed resistors 11 and 12 which, in turn, are connected in series circuit relationship across the photoconductive element 3.

According to the teachings of the invention, a variable resistor corresponding to the variable resistor 10 disposed in the main body of the camera as shown in FIG. 1 is separately disposed on an interchangeable magazine which will be subsequently described in conjunction with FIG. 2.

In FIG. 2, the main body 20 of a small-sized cinematographic camera has disposed therein a photographic objective 21. A pair of diaphragm blades or sector 22 and 23 are pivotably secured at respective pivot pins 24 and 25 so as to be disposed oppositely to each other and to be overlappable each other and a projection 26 disposed on the blade 22 cooperates with a groove 27 formed on the blade 23 to effect movement of both blades.

An electric circuit within the main body 20 to automatically set a stop for the objective 21 in accordance with an amount of light incident upon a photoconductive element is essentially the same as that illustrated in FIG. 1 and need not be described. The corresponding circuit elements are designated by the like reference numerals employed in FIG. 1 and primed.

Figure 2A:
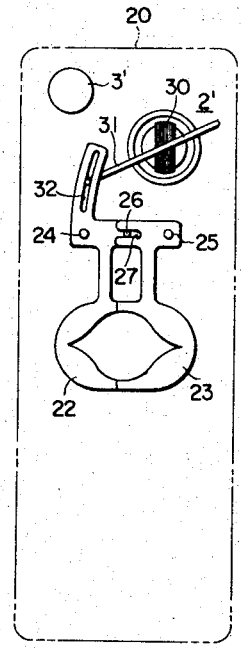
FIG. 2a shows a front view of an automatic exposure device embodying the teachings of the invention.

A current from an electric source 1' due to a variation in resistance of a photoconductive element 3' flows through a moving coil 30 of a galvanometer 2' to swing the same and hence a pointer 31 integral with the coil in accordance with an amount of light falling upon the photoconductive element 3'. As best shown in FIG. 2a, the pointer 31 has its free end engaging a slot 32 forming the diaphragm blade 22. Therefore, it will be appreciated that the movement of the pointer 31 causes the blades 22 and 23 to move toward or away from each other about the respective pivots 24 and 25 thereby to set an aperture formed by the blades in accordance with the amount of light incident upon the photoconductive element 3'.

Figure 2B:
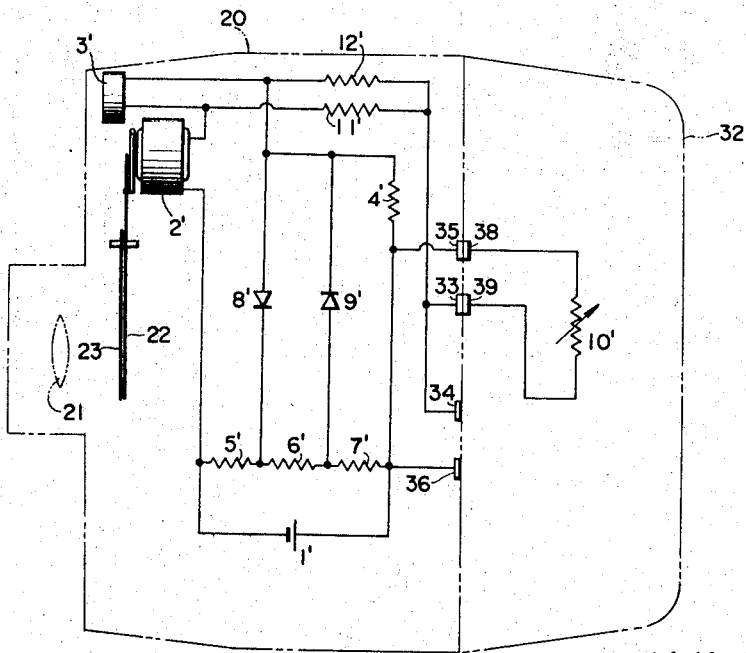

According to the teachings of the invention a variable resistor 10 controlled in magnitude of resistance according to a sensitivity of a cinefilm involved is disposed within an interchangeable magazine 32 as shown in FIG. 2b. A pair of fixed resistors 11' and 12' serially connected across the photoconductive element 3' are electrically connected to a pair of common electric contacts 33 and 34 disposed on that surface of the main body 20 on which the main body is operatively coupled to the magazine 32 and the fixed resistors 4' and 7' and the source 1' are electrically connected to a pair of common contacts 36 disposed on the same coupling surface. The contacts 33 and 35 may be preferably positioned relative to the contacts 34 and 36 such that the corresponding contacts are disposed symmetrically with respect to the optical axis of the objective 21 for the purpose as will be subsequently apparent.

On the other hand, a pair of contacts 38 and 39 are disposed on that surface of the magazine on which it is operatively connected to the main body 20 in such positions that, when the magazine engages the main body, the contacts 38 and 39 can selectively engage the associated contacts 35 and 33 or 34 and 36 regardless of whether the magazine engages the main body in its normal position or its inverted position. The contacts 38 and 39 are respectively connected to both ends of the variable resistor 10 disposed within the magazine 32.

Therefore, it will be readily appreciated that with the magazine engaging the main body, an electric circuit identical that previously described in conjunction with FIG. 1 is completed and serves to automatically set the aperture formed by the diaphragm blades in accordance with both an amount of light incident upon the photoconductive element and a sensitivity of a cinefilm loaded in an interchangeable magazine.

Figure 3:
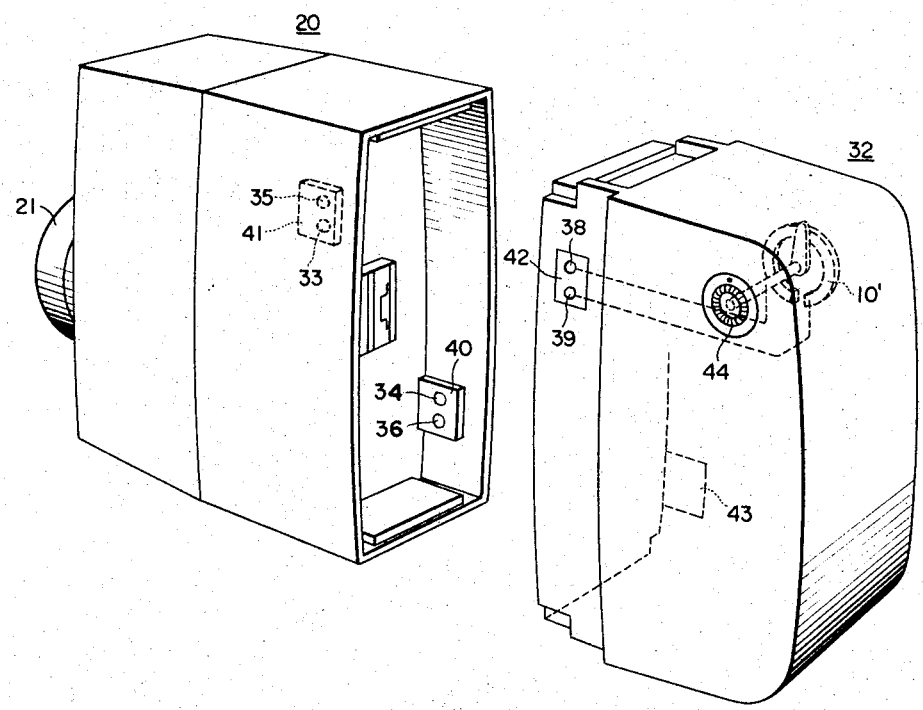

Referring now to FIG. 3 there is illustrated, by way of example, a suitable position relationship between the contacts 33–39, the variable resistor 10', the main body 20, the magazine 32. As shown in FIG. 3 the main body 20 has its rear portion recessed into which the front portion of the magazine 32 is adapted to be snugly fitted. Rigidly secured on the inner wall surface of the recessed portion of the main body is any suitable electrically insulating plate 40 at any suitable position, for example, on the right and lower portion thereof as viewed in FIG. 3. Another insulating plate 41 is similarly disposed on the lefthand and upper portion of the inner wall surface in diametrically opposed relationship. Each insulating plate includes a pair of contacts corresponding to the contacts 35 and 36 or 33 and 34.

The magazine 32 is provided with a suitable electrically insulating plate 42 with a pair of contacts 39 and 38 located on the side wall at such a position that, when the magazine engages the main body, these contacts engage the associated contacts 33 and 35 or 34 and 36. In order that with the magazine fitted into the main body, one of the contact pair not contacting the contact pair on the magazine is prevented from shortcircuiting through the metallic material for the magazine, an electrically insulating plate 43 is provided on the opposite side wall of the magazine at such a position that that plate opposes to the one of contact pair on the main body. For example, when the magazine 32 in its position illustrated in FIG. 3 is fitted into the rear portion of the main body, the contact pair 33–34 on the main body engages the contacts 38–39 while the contact pair 35–36 opposes the insulating plate 43 and remains ineffective. If the magazine engages the main body upside down, the contacts 35 and 36 are connected to the contacts 38 and 39 as shown in FIG. 2.

FIG. 3 also shows the variable resistor 10' disposed within the magazine 32 and operatively connected to a knob 44 disposed on the outer wall surface. The variable resistor 10' which may be preferably of a continuously variable resistance type is connected between the contacts 38 and 39 through conductors designated by dotted line in FIG. 3. The knob 44 can be rotated to set the resistance of the variable resistor 10' in accordance with a sensitivity of a cinefilm (not shown) loaded in the magazine. Therefore, it will be appreciated that the magazine having a length of cinefilm loaded therein and variable resistor controlled as above described engages the associated main body of the camera to complete the electric circuit serving to effect automatic exposure control in accordance with both an amount of light incident upon the photoconductive element and sensitivity of a cinefilm involved.

If it is desired to selectively use a plurality of lengths of cinefilm different in sensitivity, the same can be loaded in a plurality of the present magazines and the associated variable resistors 10' be controlled in resistance in accordance to the sesitivities of the cinefilms respectively. The selected one of such magazines engages the main body of the camera to complete the automatic exposure control circuit as above described. Thus the invention eliminates the necessity of setting an automatic exposure mechanism to a sensitivity of a cinefilm involved each time the magazines are interchanged.

While the invention has been illustrated and described in conjunction with a single embodiment thereof it is to be understood that various changes in the detail in construction and the combination and arrangement of parts may be resorted to without departing from the spirit and scope of the invention. For example, the variable resistor 10' may have the magnitude of resistance stepwise varied.

What I claim is:

1. A sensitivity controlled change-over device for use with a small-sized cinematographic camera including a main body, a cinefilm chamber or magazine detachably secured to the main body, and an automatic exposure mechanism, characterized by a sensitivity set member on the magazine manually adjustable in accordance with a sensitivity of the particular cinefilm loaded in the magazine, said sensitivity set member being arranged such that when the magazine with the sensitivity set member adjusted to the sensitivity of the cinefilm loaded in the same is operatively coupled to the main body, an electric circuit within the main body to control the automatic exposure mechanism is electrically connected to an electric circuit with the sensitivity set member to set the automatic exposure mechanism to the sensitivity of the cinefilm in the magazine.

2. A sensitivity controlled change-over device as claimed in claim 1 wherein said sensitivity set member is a variable resistor disposed on each of the interchangeable magazines and controllable in resistance in accordance with the sensitivity of the cinefilm loaded in each magazine, said variable resistor having two pair of contacts disposed on that surface of the magazine on which the magazine is operatively connected to the main body of the camera, symmetrically with the optical axis of the objective, each pair of contacts serving to complete the electric circuit for setting the automatic exposure mechanism in accordance with both an amount of light falling upon said photoconductive element and said sensitivity of the cinefilm involved.

References Cited

UNITED STATES PATENTS

| 2,186,611 | 1/1940 | Martin | 95—64 |
| 3,266,395 | 8/1966 | Kremp et al. | 352—72 |

FOREIGN PATENTS

| 864,803 | 1/1953 | Germany. |

JULIA E. COINER, *Primary Examiner.*